(12) United States Patent
Paramashiva et al.

(10) Patent No.: US 12,473,151 B2
(45) Date of Patent: Nov. 18, 2025

(54) REINFORCEMENT TO REDUCE NOISE AND IMPROVE FLEXURAL STRENGTH FOR METAL ROLLERS

(71) Applicant: Intelligrated Headquarters, LLC, Mason, OH (US)

(72) Inventors: Jayanth Paramashiva, Bangalore (IN); Kishor Mujumdar, Bangalore (IN); Charankumar Kodandaramaiah, Bangalore (IN)

(73) Assignee: Intelligrated Headquarters, LLC, Mason, OH (US)

( * ) Notice: Subject to any disclaimer, the term of this patent is extended or adjusted under 35 U.S.C. 154(b) by 160 days.

(21) Appl. No.: 18/459,722

(22) Filed: Sep. 1, 2023

(65) Prior Publication Data
US 2025/0026576 A1    Jan. 23, 2025

(30) Foreign Application Priority Data
Jul. 19, 2023    (IN) .............................. 202311048454

(51) Int. Cl.
| | | |
|---|---|---|
| *B65G 39/09* | (2006.01) | |
| *B65G 13/00* | (2006.01) | |
| *B65G 39/02* | (2006.01) | |
| *B65G 39/04* | (2006.01) | |
| *B65G 39/06* | (2006.01) | |

(52) U.S. Cl.
CPC .............. *B65G 39/09* (2013.01); *B65G 13/00* (2013.01); *B65G 39/04* (2013.01); *B65G 39/06* (2013.01); *B65G 39/02* (2013.01)

(58) Field of Classification Search
CPC ........ B65G 39/09; B65G 39/04; B65G 39/06; B65G 13/00; B65G 39/02
USPC ......................................... 193/37; 492/39–40
See application file for complete search history.

(56) References Cited

U.S. PATENT DOCUMENTS

| | | | | |
|---|---|---|---|---|
| 2,761,547 A | * | 9/1956 | Gehrer .................... | B65G 39/02 198/780 |
| 3,662,446 A | * | 5/1972 | Walls ..................... | D06B 23/02 492/50 |
| 4,841,613 A | * | 6/1989 | Beery ................ | G03G 15/2092 492/50 |

(Continued)

FOREIGN PATENT DOCUMENTS

| | | |
|---|---|---|
| CN | 202464712 U | 10/2012 |
| CN | 105173601 A | 12/2015 |

(Continued)

OTHER PUBLICATIONS

Extended European Search Report Mailed on Nov. 19, 2024 for EP Application No. 24181520, 9 page(s).

*Primary Examiner* — Mark A Deuble
(74) *Attorney, Agent, or Firm* — Alston & Bird LLP

(57) ABSTRACT

An example roller is provided. The example roller can include a metal tube extending between a first end and a second end, where the metal tube includes an outer surface and an inner surface. The example roller can include a first bearing disposed at the first end. The example roller can include a second bearing disposed at the second end. The example roller can include a reinforcement filling in contact with the inner surface of the metal tube, wherein the reinforcement filling is made at least partially of a non-metal material.

20 Claims, 8 Drawing Sheets

(56) References Cited

U.S. PATENT DOCUMENTS

| | | | | |
|---|---|---|---|---|
| 4,956,211 A | * | 9/1990 | Saito | G03G 15/1685 |
| | | | | 428/318.6 |
| 5,411,463 A | * | 5/1995 | Brookstein | B29C 70/462 |
| | | | | 29/895.32 |
| 5,766,120 A | | 6/1998 | Schmitz | |
| 5,848,958 A | * | 12/1998 | Damkjaer | B65G 39/02 |
| | | | | 492/38 |
| 9,096,379 B2 | | 8/2015 | Gilley, Jr. et al. | |
| 10,222,721 B2 | * | 3/2019 | Kusano | G03G 15/0808 |
| 2006/0180426 A1 | * | 8/2006 | Scott | B65G 39/02 |
| | | | | 193/37 |
| 2007/0099781 A1 | | 5/2007 | Itoh et al. | |

FOREIGN PATENT DOCUMENTS

| | | |
|---|---|---|
| DE | 1980663 U | 3/1968 |
| DE | 1272218 B | 7/1968 |
| EP | 0019080 A1 | 11/1980 |

\* cited by examiner

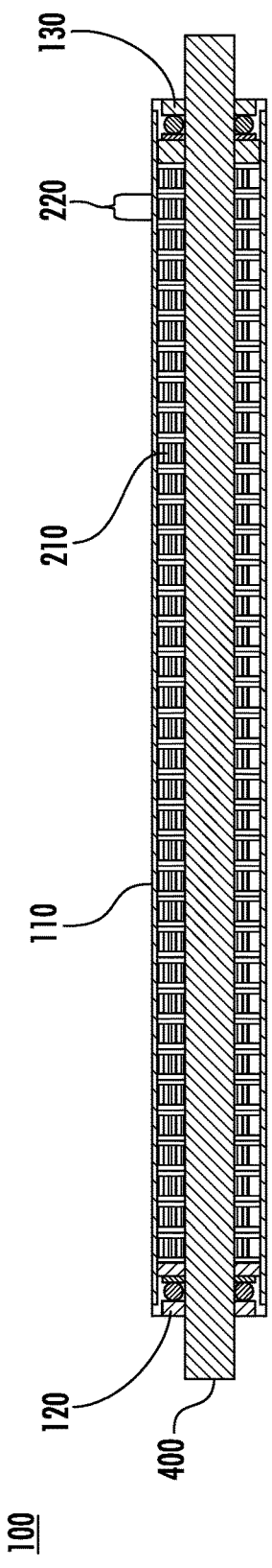
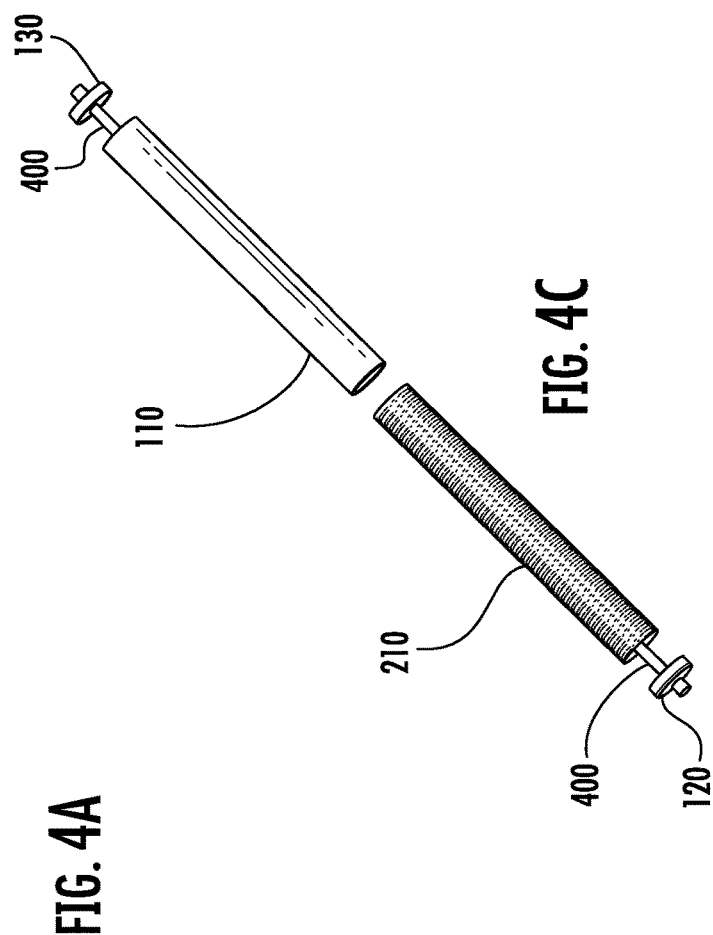
FIG. 4A
FIG. 4B
FIG. 4C

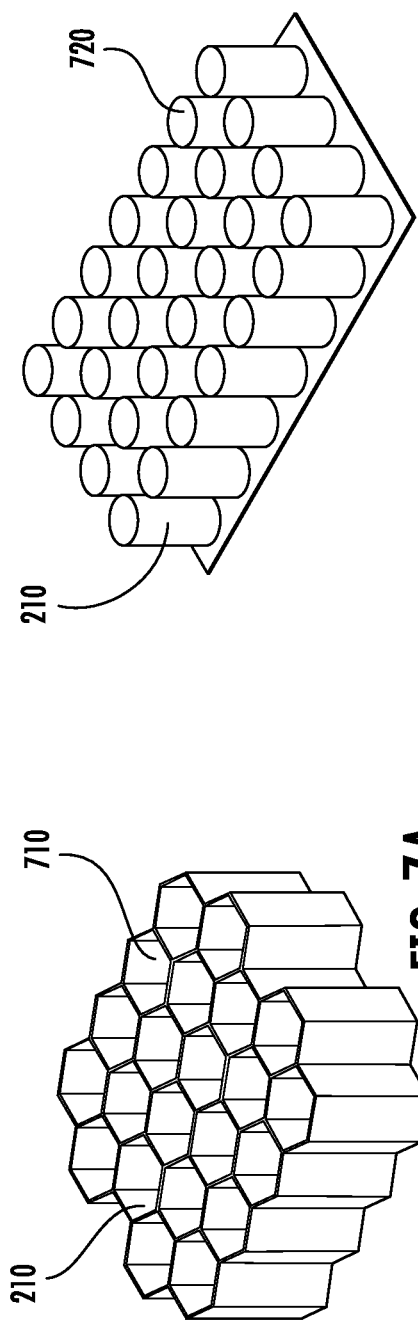
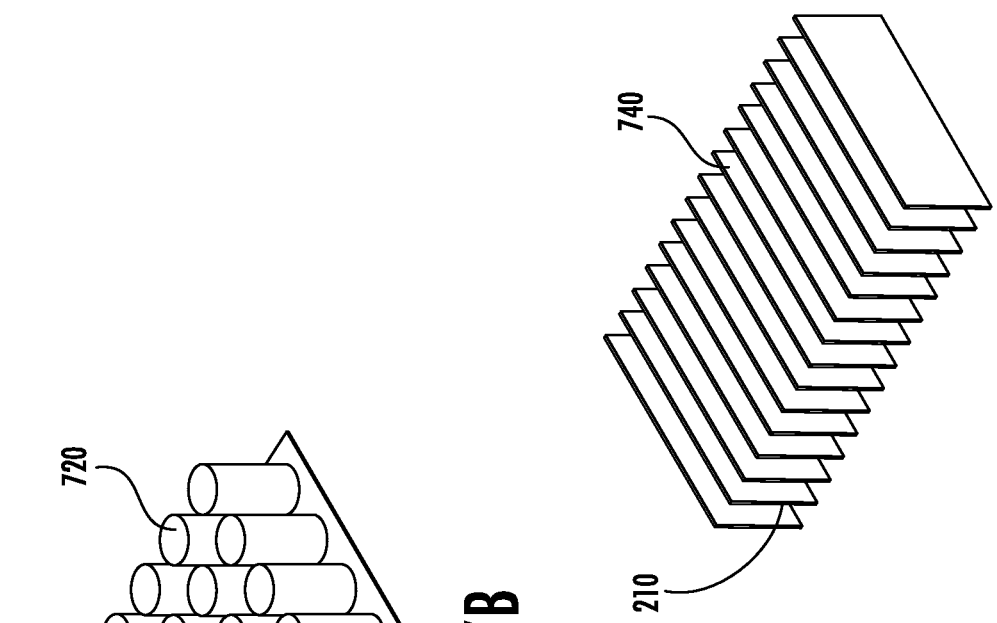
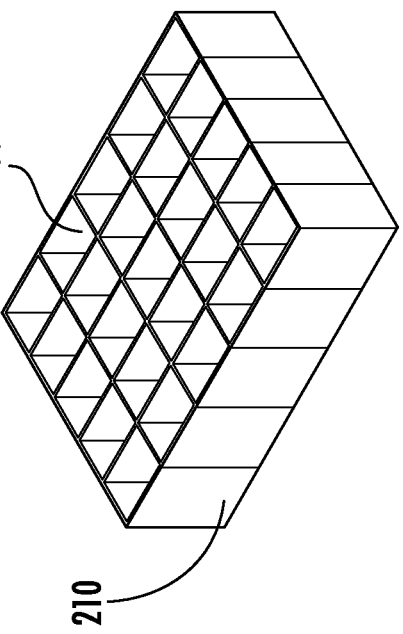
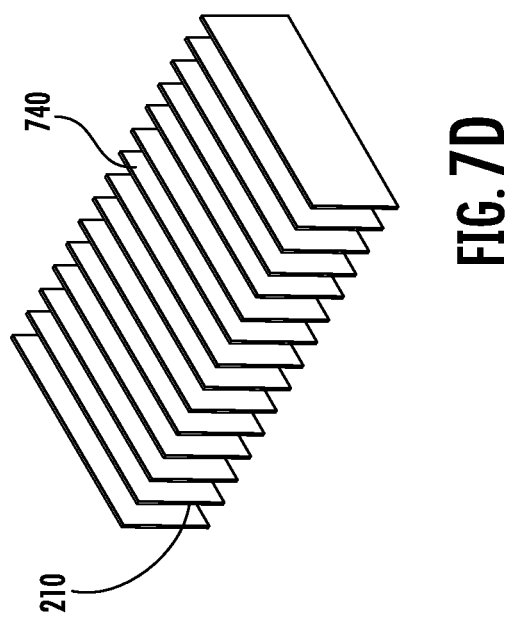
FIG. 7A
FIG. 7B
FIG. 7C
FIG. 7D

REINFORCEMENT TO REDUCE NOISE AND IMPROVE FLEXURAL STRENGTH FOR METAL ROLLERS

CROSS REFERENCE TO RELATED APPLICATIONS

This application claims priority to India Provisional Patent Application No. 202311048454, filed Jul. 19, 2023, the contents of which are incorporated by reference herein in its entirety.

TECHNICAL FIELD

The present application relates generally, in some examples, to a roller. More specifically, the present application relates, in some examples, to a reinforced metal roller.

BACKGROUND

Metal rollers are sometimes used in conveyors. For example, one or more metal rollers may be used to transport an object. The inventors have identified numerous deficiencies and problems with the existing technologies in this field. For example, existing technologies may result in excessively loud noise during transportation. In addition, existing technologies are a heavy and result in increased weight of a roller system. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In an example embodiment, a roller is provided. The example roller includes a metal tube extending between a first end and a second end, where the metal tube includes an outer surface and an inner surface. The example roller includes a first bearing disposed at the first end. The example roller includes a second bearing disposed at the second end. The example roller includes a reinforcement filling in contact with the inner surface of the metal tube, where the reinforcement filling is made at least partially of a non-metal material.

In an example embodiment, the reinforcement filling fills a space inside the metal tube and between the first bearing and the second bearing.

A roller of an example embodiment further includes a shaft extending through the metal tube and between the first bearing and the second bearing.

In an example embodiment, the reinforcement filling fills a space inside the metal tube, outside the shaft, and between the first bearing and the second bearing.

In an example embodiment, the reinforcement filling includes a corrugated plastic filling.

In an example embodiment, the corrugated plastic filling includes at least one of a honeycomb reinforcement structure, a bubble reinforcement structure, a rectangular reinforcement structure, or a plate reinforcement structure.

In an example embodiment, the corrugated plastic filling includes a plurality of corrugated sheets.

In an example embodiment, each of the plurality of corrugated sheets are stacked in a direction extending between the first bearing and the second bearing.

In an example embodiment, each of the plurality of corrugated sheets defines a circular shape.

In an example embodiment, each of the plurality of corrugated sheets is disposed between two reinforcement layers.

In an example embodiment, each of the plurality of corrugated sheets is further disposed between two surface treatment layers.

In an example embodiment, the plurality of corrugates sheets are fused together.

In an example embodiment, the reinforcement filling includes a silicone-based powder.

The roller of an example embodiment further includes a motor positioned inside the metal tube.

In an example embodiment, the reinforcement filling fills a space inside the metal tube, outside the motor, and between the first bearing and the second bearing.

In an example embodiment, the metal tube includes 20 gauge metal.

In an example embodiment, at least one of the first bearing or the second bearing includes a hex shaft.

In an example embodiment, a roller conveyor system is provided. The example roller conveyor system includes one or more conveyor frames. The example roller conveyor system includes one or more conveyor legs. The example roller conveyor system includes one or more example rollers. Each of the example rollers includes a metal tube extending between a first end and a second end, where the metal tube includes an outer surface and an inner surface. Each of the example rollers includes a first bearing disposed at the first end. Each of the example rollers includes a second bearing disposed at the second end. Each of the example rollers includes a reinforcement filling in contact with the inner surface of the metal tube, where the reinforcement filling is made at least partially of a non-metal material.

In an example embodiment, the reinforcement filling fills a space inside the metal tube and between the first bearing and the second bearing.

Each of the rollers of an example embodiment further includes a shaft extending through the metal tube and between the first bearing and the second bearing.

In an example embodiment, the reinforcement filling fills a space inside the metal tube, outside the shaft, and between the first bearing and the second bearing.

In an example embodiment, the reinforcement filling includes a corrugated plastic filling.

In an example embodiment, the corrugated plastic filling includes at least one of a honeycomb reinforcement structure, a bubble reinforcement structure, a rectangular reinforcement structure, or a plate reinforcement structure.

In an example embodiment, the corrugated plastic filling includes a plurality of corrugated sheets.

In an example embodiment, each of the plurality of corrugated sheets are stacked in a direction extending between the first bearing and the second bearing.

In an example embodiment, each of the plurality of corrugated sheets defines a circular shape.

In an example embodiment, each of the plurality of corrugated sheets is disposed between two reinforcement layers.

In an example embodiment, each of the plurality of corrugated sheets is further disposed between two surface treatment layers.

In an example embodiment, the plurality of corrugates sheets are fused together. In an example embodiment, the reinforcement filling includes a silicone-based powder.

Each of the plurality of rollers of an example embodiment further includes a motor positioned inside the metal tube.

In an example embodiment, the reinforcement filling fills a space inside the metal tube, outside the motor, and between the first bearing and the second bearing.

In an example embodiment, the metal tube includes 20 gauge metal.

In an example embodiment, at least one of the first bearing or the second bearing includes at least one of a hex shaft or a circular shaft.

BRIEF DESCRIPTION OF THE DRAWINGS

Figure 1:
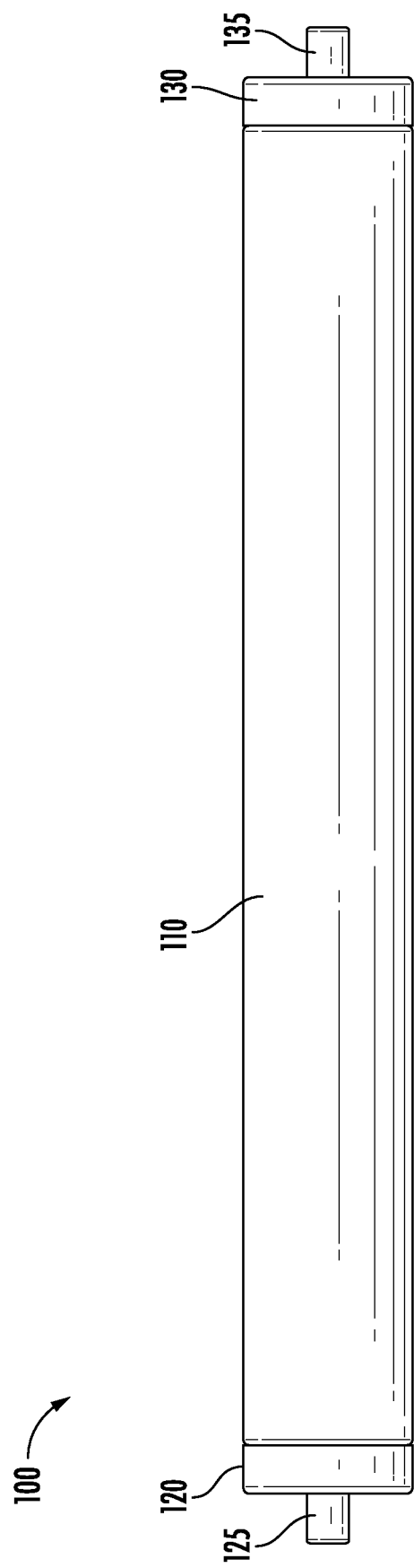

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a front view of a roller in accordance with an example embodiment of the present disclosure.

Figure 2A:
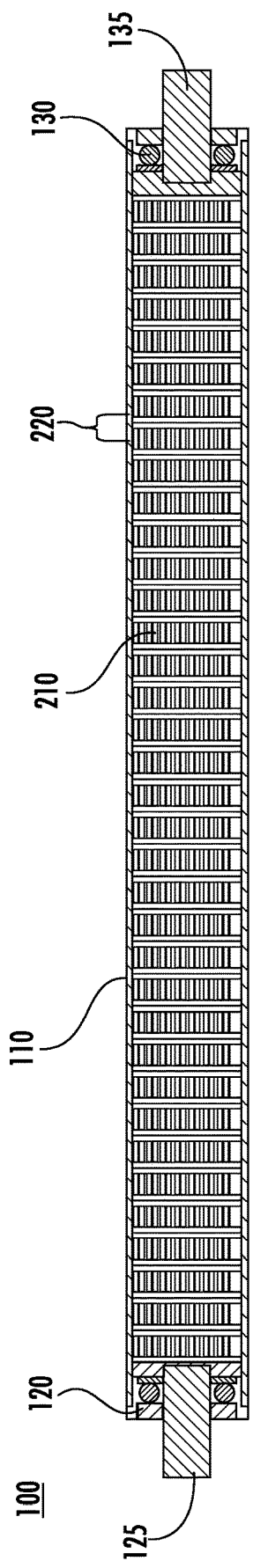

FIG. 2A provides a front cross-sectional view of a roller in accordance with an example embodiment of the present disclosure.

Figure 2C:
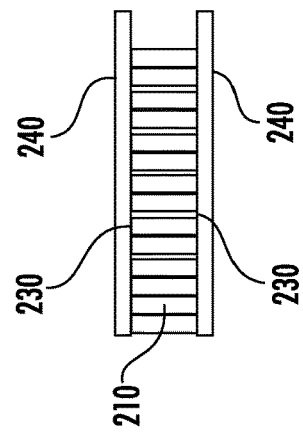
Figure 2B:
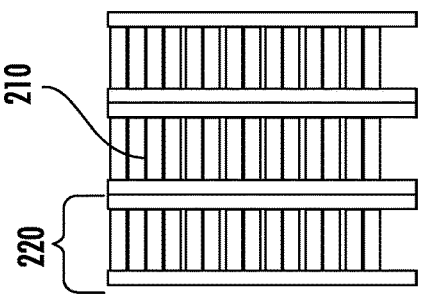

FIG. 2B provides a front view of a plurality of corrugated sheets fused together in accordance with an example embodiment of the present disclosure.

FIG. 2C provides a front view of an individual corrugated sheet in accordance with an example embodiment of the present disclosure.

Figure 3:
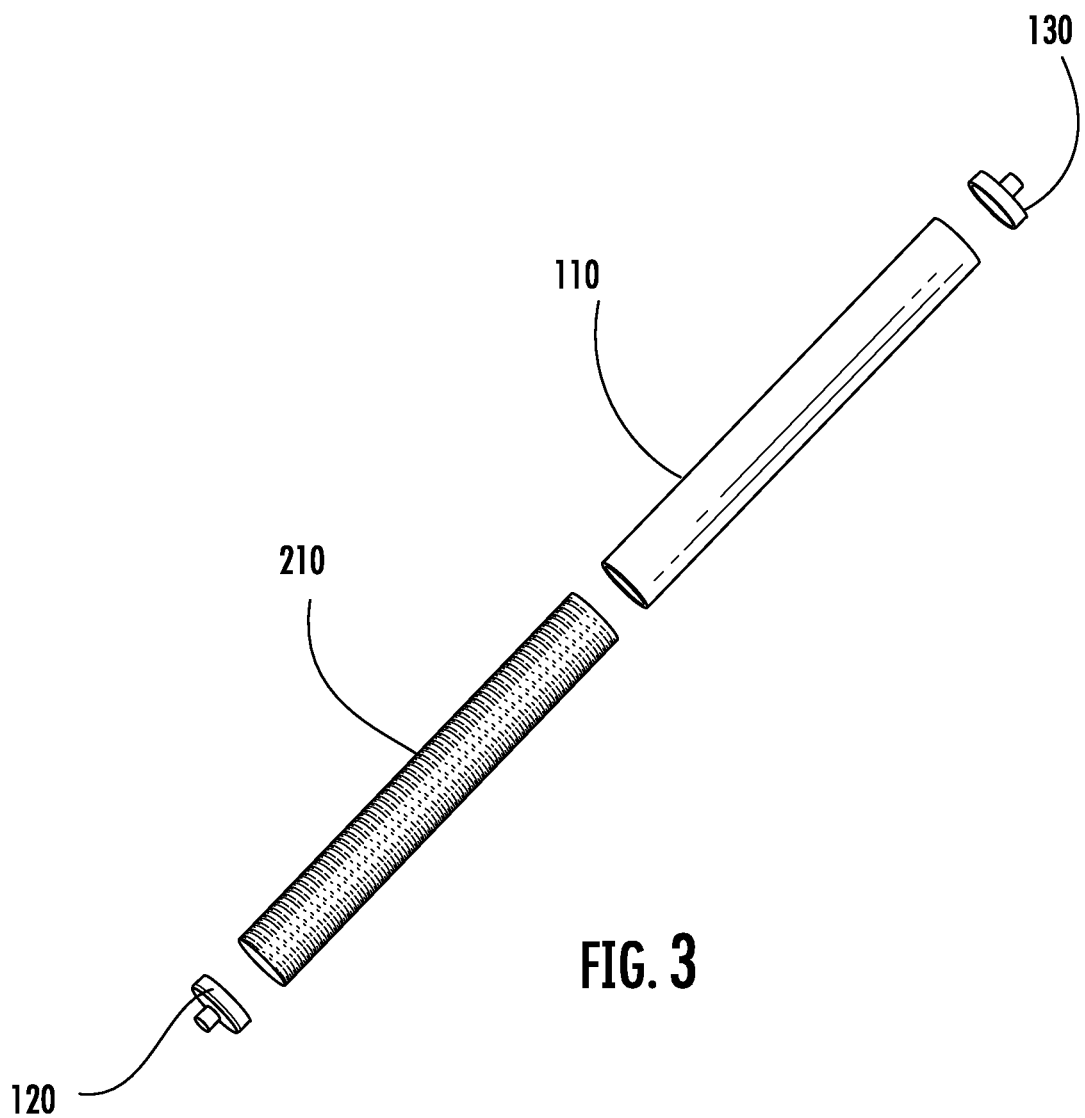

FIG. 3 provides an exploded view of a roller in accordance with an example embodiment of the present disclosure.

FIG. 4A provides a front cross-sectional view of a roller with a shaft in accordance with an example embodiment of the present disclosure.

FIG. 4B provides a side cross-sectional view of a roller with a shaft in accordance with an example embodiment of the present disclosure.

FIG. 4C provides an exploded view of a roller with a shaft in accordance with an example embodiment of the present disclosure.

Figure 5B:
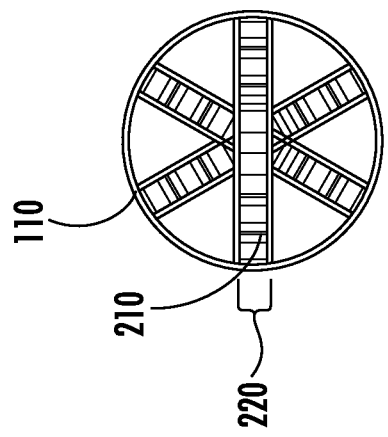
Figure 5C:
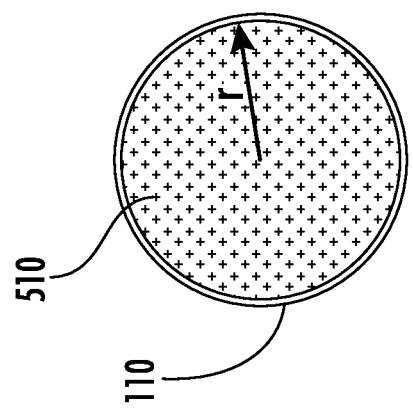
Figure 5A:
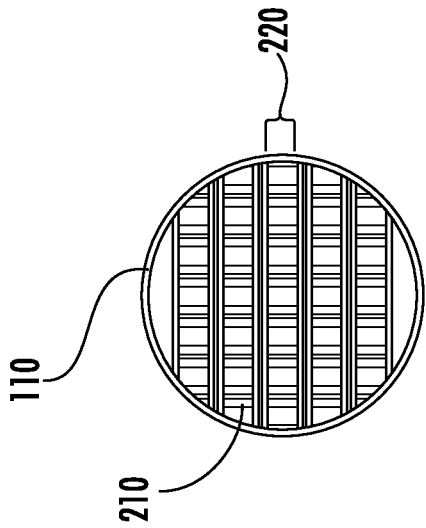

FIG. 5A provides a side cross-sectional view of a roller with corrugated sheets stacked inside in accordance with an example embodiment of the present disclosure.

FIG. 5B provides a side cross-sectional view of a roller with corrugated sheets stacked inside in accordance with an example embodiment of the present disclosure.

FIG. 5C provides a side cross-sectional view of a roller filled with silicone-based powder in accordance with an example embodiment of the present disclosure.

Figure 6:
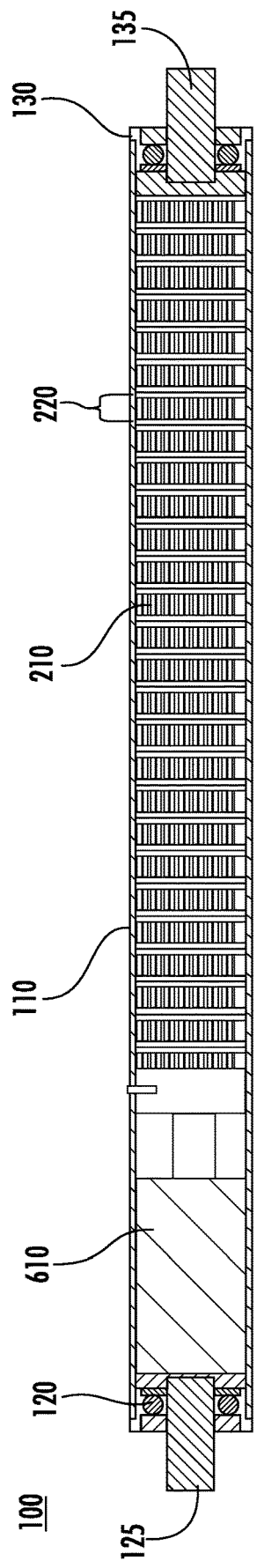

FIG. 6 provides a front cross-sectional view of a roller with a motor in accordance with an example embodiment of the present disclosure.

FIG. 7A provides a perspective view of a honeycomb reinforcement structure in accordance with an example embodiment of the present disclosure.

FIG. 7B provides a perspective view of a bubble reinforcement structure in accordance with an example embodiment of the present disclosure.

FIG. 7C provides a perspective view of a rectangular reinforcement structure in accordance with an example embodiment of the present disclosure.

FIG. 7D provides a perspective view of a plate reinforcement structure in accordance with an example embodiment of the present disclosure.

Figure 8:
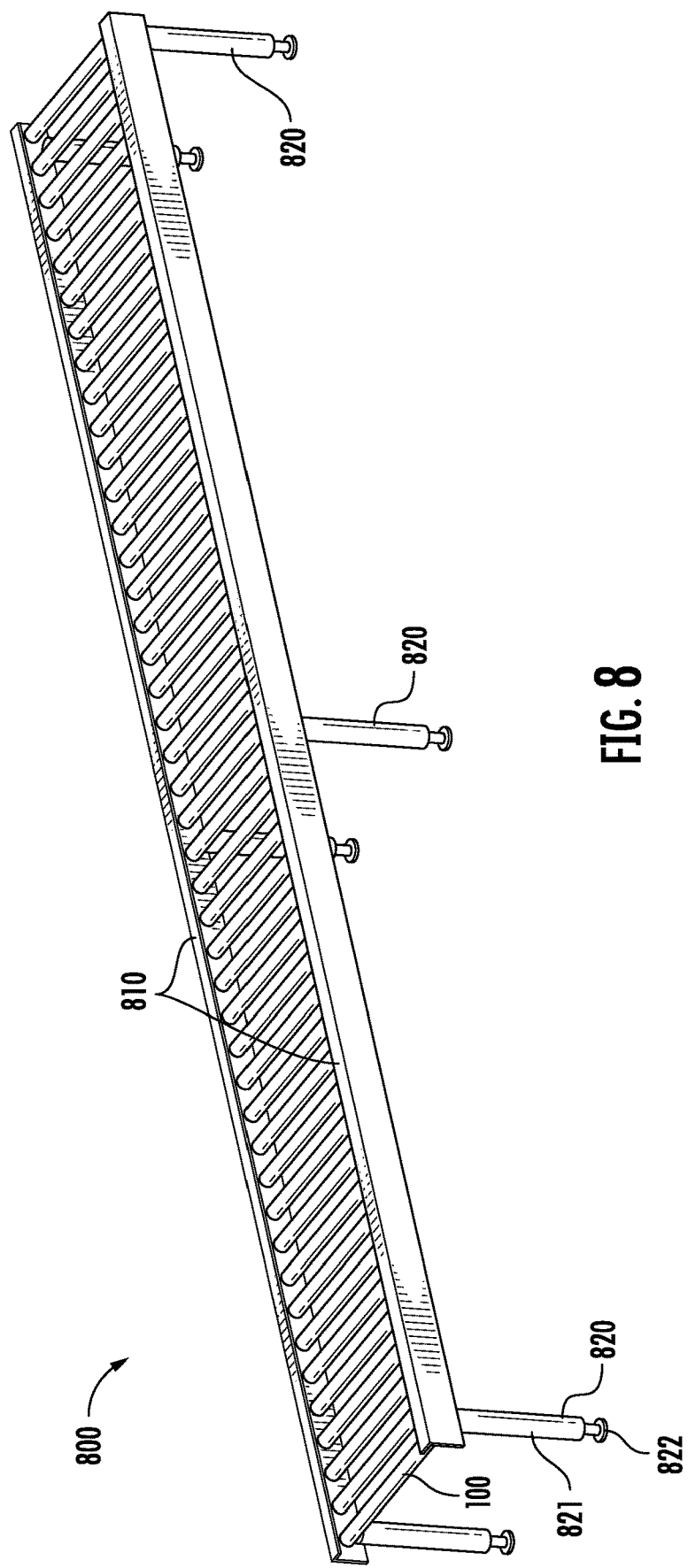

FIG. 8 provides a perspective view of a roller conveyor system in accordance with an example embodiment of the present disclosure.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein. As used herein, coupling can be accomplished through welding one component to another component.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

It is desirable, in some examples, for rollers to be lightweight and produce a low amount of noise while in use. Embodiments of the present disclosure include, but are not limited to, a reinforced metal roller that is lightweight and does not create excessive noise. For example, example reinforced metal rollers may produce 10% to 20% less noise than existing technologies.

Turning now to FIG. 1, an example roller 100 is provided. In one or more embodiments, the example roller 100 has a cylindrical shape. The example roller 100 may extend between a first end and a second end.

In one or more embodiments, a roller 100 has a metal tube 110 having a cylindrical shape. For example, metal tube 110 may extend between the first end and the second end. In some examples, metal tube 110 has a diameter equal to the diameter of the roller 100. In some examples, metal tube 110 has a hollow cylindrical shape.

In one or more embodiments, metal tube 110 is made of, for example, ferrous or non-ferrous metals. For example, metal tube 110 may be made of stainless steel.

In one or more embodiments, metal tube 110 has an outer surface and an inner surface. In some examples, metal tube 110 has a low thickness between the outer surface and the inner surface. For example, metal tube 110 may have a thickness less than 16 gauge, in some examples, a thickness of 20 gauge in other examples, and a thickness of 3 mm in yet other examples. The low thickness of metal tube 110 provides example benefits including decreased weight and cost. The example roller 100 is able to bear weight with a lower thickness due, for example, a reinforcement filling such as a corrugated plastic material or a silicone-based powder.

In one or more embodiments, a roller has a first bearing 120 disposed at the first end of roller 100. In some examples, first bearing 120 has a circular shape. For example, first bearing 120 may have a circular shape and have a diameter equal to the diameter of roller 100 and/or outer layer 110.

In one or more embodiments, first bearing 120 is made of a hard material. For example, first bearing 120 may be made of ferrous metal, chrome steal, stainless steel, polymer plastic (e.g., nylon, polyoxymethylene, etc.), a hybrid material, and/or the like In one or more embodiments, first bearing 120 is coupled to the first end of roller 100. For example, first bearing 120 may be coupled to outer layer 110 of roller 100 and/or materials inside of outer layer 110. For example, first bearing 120 may be coupled to a corrugated plastic filling inside roller 100. As another example, first bearing 120 may be coupled to a motor placed inside of roller 100. In some examples, first bearing 120 is fused to roller 100 via ultrasonic welding, friction welding, press fitting, and/or the like.

In one or more embodiments, first bearing 120 includes a shaft 125. In some examples, shaft 125 extends away from roller 100. In some examples, shaft 125 is a hex shaft, and in other examples, shaft 125 may be circular, rectangular, and/or the like.

In one or more embodiments, shaft 125 is made of the same material as the rest of first bearing 120. For example, shaft 125 may be made of ferrous metal, chrome steal, stainless steel, polymer plastic (e.g., nylon, polyoxymethylene, etc.), a hybrid material, and/or the like In one or more embodiments, a roller has a second bearing 130 disposed at the second end of roller 100. In some examples, second bearing 130 has a circular shape. For example, second bearing 130 may be a circular shape and have a diameter equal to the diameter of roller 100 and/or outer layer 110.

In one or more embodiments, second bearing 130 is made of a hard material. For example, second bearing 130 may be made of ferrous material, chrome steal, stainless steel, polymer plastic (e.g., nylon, polyoxymethylene, etc.), a hybrid material, and/or the like.

In one or more embodiments, second bearing 130 is coupled to the second end of roller 100. For example, second bearing 130 may be coupled to outer layer 110 of roller 100 and/or materials inside of outer layer 110. For example, second bearing 130 may be coupled to a corrugated plastic filling inside roller 100, in other examples, second bearing 130 may be coupled to a motor placed inside of roller 100. In one or more embodiments, second bearing 130 is fused to roller 100 via ultrasonic welding, friction welding, press fitting, and/or the like.

In one or more embodiments, second bearing 130 includes a shaft 135. In some examples, shaft 135 extends away from roller 100. In some examples, shaft 135 is a hex shaft, and in other examples, shaft 135 may circular, rectangular, and/or the like.

In one or more embodiments, shaft 135 is made of the same material as the rest of second bearing 130. For example, in an embodiment where second bearing 130 is made of metal, shaft 135 is made of metal.

Turning now to FIG. 2A, a front cross sectional view of an example roller 100 is provided. In this example, roller 100 includes reinforcement filling 210. In some examples, reinforcement filling 210 consists of a plurality of corrugated sheets 220. In some examples, reinforcement filling 210 is in contact with the inner surface of metal tube 110.

In one or more embodiments, reinforcement filling 210 is made at least partially of a non-metal material. For example, reinforcement filling 210 may be made of a polymer material, wood, a rubber material, wood and polymer composite material, or other composite materials that would provide reinforcement to roller 100. In some examples, reinforcement filling 210 includes additives. In some examples, reinforcement filling 210 is a corrugated plastic filling such as polypropylene or other similar materials.

For example, reinforcement filling 210 may be made of a lightweight plastic or silicone-based material that provides reinforcement to roller 210. In some examples, reinforcement filling 210 is lighter in weight than metal materials. In some examples, reinforcement filling 210 increases the flexural strength by 50% to 100% compared to non-reinforced rollers. In some examples, reinforcement filling 210 dampens noise produced by roller 100 by 10% to 20%.

In one or more embodiments, reinforcement filling 210 is shaped into alternating ridges and/or grooves. For example, reinforcement filling 210 is textured. For example, reinforcement filling 210 may include a honeycomb structure, a bubble structure, a series of rectangular grooves, a series of plate-shaped grooves, and/or the like.

In one or more embodiments, metal tube 110 is configured house the plurality of corrugated sheets 220. For example, the plurality of corrugated sheets 220 may be pushed into the metal tube 110.

In one or more embodiments, the plurality of corrugated sheets 220 are stacked such that a space inside the metal tube 110 and between the first bearing 120 and the second bearing 130 is filled. For example, corrugated sheets 220 may be stacked in a direction extending between first bearing 120 and second bearing 130. In other examples, corrugated sheets 220 are stacked in a direction perpendicular to a direction between first bearing 120 and second bearing 130. For example, each of corrugated sheets 220 may extend fully between first bearing 120 and second bearing 130 and be stacked to fill the metal tube 110. In other examples, corrugated sheets 220 do not extend fully between first bearing 120 and second bearing 130. In these examples, corrugated sheets 220 may be stacked both in the direction between first bearing 120 and second bearing 130 and perpendicularly to the direction between first bearing 120 and second bearing 130. For example, corrugated sheets 220 may be stacked such that a space a space inside the metal tube 110 and between the first bearing 120 and the second bearing 130 is filled.

In one or more embodiments, as shown in FIG. 2A, one or more of the plurality of corrugated sheets 220 may define a circular shape. Additionally or alternatively, one or more of the plurality of corrugated sheets 220 may be square, rectangular, oval, triangular, hexagonal, and/or the like. In some examples, the plurality of corrugated sheets 220 may comprise a plurality of uniform or different shapes.

Turning now to FIG. 2B, a front view of a plurality of corrugated sheets 220 is provided in accordance with example embodiments of the present disclosure. In some examples, the plurality of corrugated sheets 220 are fused together. For example, the plurality of corrugated sheets 220 may be fused together by an adhesive, by stacking under heat and pressure, and/or the like. In some, the plurality of corrugated sheets 220 are fused together and then pushed into the metal tube 110.

In one or more embodiments, the plurality of corrugated sheets 220 are each made of a corrugated plastic material (e.g., polypropylene). For example, each of corrugated sheets 220 may have a honeycomb, bubble, rectangular, plate, and/or the like structure. In some examples, each of corrugated sheets 220 shares the same structure, and in other examples, the plurality of corrugated sheets 220 include corrugated sheets with varied structures. The plurality of corrugated sheets 220 may provide reinforcement when an example roller 100 is bearing weight.

Turning now to FIG. 2C, an example individual corrugated sheet 220 is provided. For example, the individual corrugated sheet 220 may be any of the plurality of corrugates sheets 220 depicted in FIGS. 2A-2B.

In one or more embodiments, each of the plurality of corrugated sheets 220 is disposed between a two reinforcement layers 230. For example, the reinforcement layers 230 each cover a side of corrugated sheet 220. In this example, the reinforcement layers 230 are made of fiberglass or other plastic materials that provide strength and structural integrity to corrugated sheet 220.

In one or more embodiments, each of the plurality of corrugated sheets 220 and the surrounding reinforcement layers 230 are disposed between two surface treatment layers 240. For example, surface treatment layers 240 may be fused to the corrugated sheet 220 and/or reinforcement layers 230 through thermal fusing, thermoforming, compression molding, and/or the like. In some examples, surface treatment layers 240 are configured to increase the strength of corrugated sheet 220. In some examples, surface treatment layers 240 are configured to be fused to a surface treatment layer of a different corrugated sheet.

In one or more embodiments, surface treatment layers 240 may be made of a polymer (e.g., plastic) material. In some examples, surface treatment layers 240 may include additives such as glass fiber, minerals, chopped strand glass fiber, and/or the like.

Turning now to FIG. 3, an exploded view of an example roller 100 is provided in accordance with example embodiments of the present disclosure. In some examples, the roller 100 includes a plurality of layers positioned in between first bearing 120 and second bearing 130. In some examples, the reinforcement filling 210 is placed within a metal tube 110. For example, reinforcement filling 210 may be in contact with the inner surface of the metal tube 110. In some examples, reinforcement filling 210 and metal tube 110 extend between first bearing 120 and second bearing 130.

Turning now to FIG. 4A, a front cross-sectional view of a roller 100 is provided when the roller 100 includes a shaft 400. In this example, the reinforcement filling 210 fills a space inside the metal tube 110, outside the shaft 400, and between the first bearing 120 and the second bearing 130.

In one or more embodiments, the shaft 400 extends through the metal tube 110 and between the first bearing 120 and the second bearing 130. For example, the shaft 400 may extend through a center of the metal tube 110. In some examples, the shaft 400 is in contact with the reinforcement filling 210. In some examples, the shaft 400 is coupled to the first bearing 120 and/or the second bearing 130. In some examples, the shaft is an extension of shaft 125 and/or shaft 135.

In one or more embodiments, shaft 400 is a cylindrical shape. In other examples, shaft 400 may be a hexagonal shape, rectangular shape, and/or the like. In some examples, shaft 400 is hollow, and in other examples, shaft 400 may be solid throughout.

In one or more embodiments, shaft 400 is made of a metal material. For example, shaft 400 may be made of an identical material to first bearing 120 and/or second bearing 130. As another example, shaft 400 may be made of an identical material to shaft 125 and/or shaft 135. In some examples, shaft 400 may be made of carbon steel, stainless steel (e.g., grade 306, grade 316, etc.), ferrous material, and/or the like.

Turning now to FIG. 4B, a side cross-section view of a roller 100 including a metal tube 110 and a shaft 400 is provided in accordance with example embodiments of the present disclosure. In some examples, shaft 400 has a smaller diameter than metal tube 110. For example, shaft 400 may have a diameter of 10-11 mm. In some examples, reinforcement filling 210 fills a space between the shaft 400 and the metal tube 110.

Turning now to FIG. 4C, an exploded view of an example roller 100 including a shaft 400 is provided in accordance with example embodiments of the present disclosure. In some examples, the shaft 400 is placed within the reinforcement filling 210 and the metal tube 110. For example, reinforcement filling 210 may be in contact with an outer surface of the shaft 400. In some examples, shaft 400 includes a single shaft extending from first bearing 120 to second bearing 130. In other examples, shaft 400 may be two shafts connected within roller 100. In some examples, shaft 400, reinforcement filling 210 and metal tube 110 extend between first bearing 120 and second bearing 130.

Turning now to FIG. 5A, a side cross-section view of an example roller 100 is provided. In this example, metal tube 110 is filled with a reinforcement filling 210 including a plurality of corrugated sheets 220 stacked in a direction perpendicularly to a direction extending between first bearing 120 and second bearing 130. In some examples, the plurality of corrugated sheets 220 may be fused together (e.g., by adhesives, stacking under heat and pressure, and/or the like). In other examples, the plurality of corrugated sheets 220 may be stacked without being fused. In some examples, the plurality of corrugated sheets 220 are stacked until there is not room for other corrugated sheets 220 within the metal tube.

Turning now to FIG. 5B, an alternative side cross-section view of an example roller 100 is provided. In this example, metal tube 110 is filled with a reinforcement filling 210 including a plurality of corrugated sheets 220 oriented in a plurality of different directions. In some examples, the plurality of corrugated sheets may be stacked together while being oriented in different directions.

In one or more embodiments, each of the plurality of corrugated sheets 220 may be extend partially between the first bearing 120 and the second bearing 130. In some examples the plurality of corrugated sheets 220 are stacked lengthwise between the first bearing 120 and the second bearing 130. In some examples, the direction between first bearing 120 and second bearing 130 defines an axis along which different corrugated sheets 220 extend in different directions. For example, at least one of the plurality of corrugated sheets 220 may be oriented on a horizontal plane. Additionally or alternatively, at least one of the plurality of corrugated sheets 220 may be oriented on a second plane diagonal to the horizontal plane. Additionally or alternatively, at least one of the plurality of corrugated sheets may be oriented on a third plane diagonal to the second plane and the horizontal plane.

Turning now to FIG. 5C, an alternative side cross-section view of an example roller 100 is provided. In this example, metal tube 110 is filled with a reinforcement filling 210 including a silicone-based material 510. In some examples, silicone-based material 510 is a silicone-based powder. As another example, silicone-based material 510 may be a solid rubber filling. In some examples, silicone-based material 510 may fill the entirety of metal tube 110.

Turning now to FIG. 6, a front cross-sectional view of a roller 100 is provided when the roller 100 includes a motor 610. In this example, the reinforcement filling 210 fills a space inside the metal tube 110, outside the motor 610, and between the first bearing 120 and the second bearing 130.

In one or more embodiments, motor 610 is configured to rotate the roller 100. For example, motor 610 may be configured to rotate first bearing 120 and/or second bearing 130. In other examples, motor 610 may be configured to rotate shaft 125 and/or shaft 135, in other examples, motor 610 may be configured to rotate the shaft 400, and in still other examples, motor 610 may be configured to rotate metal tube 110. Motor 610 may be, for example, a gas motor, electric motor, and/or the like. In some examples, motor 610 may be an internal or external motor driven motor.

In one or more embodiments, motor is disposed inside of metal tube 110. For example, motor 610 may be in contact with a first bearing 120, a second bearing 130, a shaft 400, and/or an inside surface of metal tube 110. In alternative examples, motor 610 may be outside metal tube 110. For example, motor 610 may be in contact with a shaft 125, a shaft 135, a first bearing 120, a second bearing 130, and/or an outside surface of metal tube 110.

Turning now to FIG. 7A, an example structure of a reinforcement filling 210 is provided. In this example, reinforcement filling 210 includes a honeycomb reinforcement structure 710. In some examples, honeycomb reinforcement structure 710 may be cut into a plurality of corrugated sheets 220.

In one or more embodiments, honeycomb reinforcement structure 710 is made of a plastic material (e.g., polypropylene). In some examples, honeycomb reinforcement structure 710 provides strength to a roller 100. In some examples, gaps in the honeycomb reinforcement structure 710 allow the roller 100 to be lighter in weight. In some examples, honeycomb reinforcement structure 710 dampens noise produced by roller 100.

Turning now to FIG. 7B, an alternative example structure of a reinforcement filling 210 is provided. In this example, reinforcement filling 210 includes a bubble reinforcement structure 720. In some examples, bubble reinforcement structure 720 may be cut into a plurality of corrugated sheets 220.

In one or more embodiments, bubble reinforcement structure 720 is made of a plastic material (e.g., polypropylene). In some examples, bubble reinforcement structure 720 provides strength to a roller 100. In some examples, gaps in the bubble reinforcement structure 720 allow the roller 100 to be lighter in weight. In some examples, bubble reinforcement structure 720 dampens noise produced by roller 100.

Turning now to FIG. 7C, an alternative example structure of a reinforcement filling 210 is provided. In this example, reinforcement filling 210 includes a rectangular reinforcement structure 730. In some examples, rectangular reinforcement structure 730 may be cut into a plurality of corrugated sheets 220.

In one or more embodiments, rectangular reinforcement structure 730 is made of a plastic material (e.g., polypropylene). In some examples, rectangular reinforcement structure 730 provides strength to a roller 100. In some examples, gaps in the rectangular reinforcement structure 730 allow the roller 100 to be lighter in weight. In some examples, rectangular reinforcement structure 730 dampens noise produced by roller 100.

Turning now to FIG. 7D, an alternative example structure of a reinforcement 210 is provided. In this example, reinforcement filling 210 includes a plate reinforcement structure 740. In some examples, plate reinforcement structure 740 may be cut into a plurality of corrugated sheets 220.

In one or more embodiments, plate reinforcement structure 740 is made of a plastic material (e.g., polypropylene). In some examples, plate reinforcement structure 740 provides strength to a roller 100. In some examples, gaps in the plate reinforcement structure 740 allow the roller 100 to be lighter in weight. In some examples, plate reinforcement structure 740 dampens noise produced by roller 100.

Turning now to FIG. 8, an example roller conveyor system 800 is provided. In one or more embodiments, a roller conveyor system 800 includes one or more conveyor frames 810, one or more conveyor legs 820, and one or more rollers 100.

In one or more embodiments, a roller conveyor system 800 includes two conveyor frames 810. In some examples, the conveyor frames 810 are positioned perpendicularly to the plurality of rollers 100. In some examples, the conveyor frames 810 extend parallel to each other. In some examples, the conveyor frames are coupled to shafts (e.g., shafts 125 and 135) attached to the one or more rollers 100.

In one or more embodiments, each conveyor frame 810 is coupled to one or more conveyor legs 820. In some examples, each of the one or more conveyor legs 820 extends perpendicularly to both the plurality of rollers 100 and the plurality of conveyor frames 810. In some examples, each of the conveyor legs 820 includes a bar portion 821 and a foot portion 822. In some examples, the foot portion 822 shaped to provide surface contact with the ground (e.g., a circular shape). In some examples, the foot portion 822 is placed at an end of the bar portion 821 distal to conveyor frame 810.

In one or more embodiments, the conveyor frames 810, bar portion 821, and/or foot portion 822 may be made of metal. In alternative examples, foot portion 822 may be made of plastic. In still other examples, foot portion 822 may be made of rubber.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A roller, comprising:
a metal tube extending between a first end and a second end, wherein the metal tube comprises an outer surface and an inner surface;
a first bearing disposed at the first end;
a second bearing disposed at the second end; and
a reinforcement filling in contact with the inner surface of the metal tube, wherein the reinforcement filling is made at least partially of a non-metal material, wherein the reinforcement filling comprises a plurality of corrugated sheets, and wherein at least a first corrugated sheet of the plurality of corrugated sheets is oriented on a horizontal plane, at least a second corrugated sheet of the plurality of corrugated sheets is oriented on a second plane diagonal to the horizontal plane, and at least a third corrugated sheet of the plurality of corrugated sheets is oriented on a third plane diagonal to the second plane and the horizontal plane.

2. The roller of claim 1, wherein the reinforcement filling fills a space inside the metal tube and between the first bearing and the second bearing.

3. The roller of claim 1, further comprising a shaft, wherein the shaft extends through the metal tube and between the first bearing and the second bearing.

4. The roller of claim 3, wherein the reinforcement filling fills a space inside the metal tube, outside the shaft, and between the first bearing and the second bearing.

5. The roller of claim 1, wherein the reinforcement filling comprises a corrugated plastic filling.

6. The roller of claim 5, wherein the corrugated plastic filling comprises at least one of a honeycomb reinforcement structure, a bubble reinforcement structure, a rectangular reinforcement structure, or a plate reinforcement structure.

7. The roller of claim 5, wherein the corrugated plastic filling comprises the plurality of corrugated sheets.

8. The roller of claim 6, wherein each of the plurality of corrugated sheets are stacked in a direction extending between the first bearing and the second bearing.

9. The roller of claim 7, wherein each of the plurality of corrugated sheets defines a circular shape.

10. The roller of claim 6, wherein each of the plurality of corrugated sheets is disposed between two reinforcement layers.

11. The roller of claim 9, wherein each of the plurality of corrugated sheets is further disposed between two surface treatment layers.

12. The roller of claim 7, wherein the plurality of corrugated sheets are fused together.

13. The roller of claim 1, wherein the reinforcement filling comprises a silicone-based powder.

14. The roller of claim 1, further comprising a motor positioned inside the metal tube.

15. The roller of claim 14, wherein the reinforcement filling fills a space inside the metal tube, outside the motor, and between the first bearing and the second bearing.

16. The roller of claim 1, wherein the metal tube comprises 20 gauge metal.

17. The roller of claim 1, wherein at least one of the first bearing or the second bearing comprises at least one of a hex shaft or a circular shaft.

18. A roller conveyor system, comprising:
one or more conveyor frames;
one or more conveyor legs; and
one or more rollers, each of the one or more rollers comprising:
a metal tube extending between a first end and a second end, wherein the metal tube comprises an outer surface and an inner surface;
a first bearing disposed at the first end;
a second bearing disposed at the second end; and
a reinforcement filling in contact with the inner surface of the metal tube, wherein the reinforcement filling comprises a silicone-based powder.

19. The roller conveyor system of claim 18, wherein the reinforcement filling fills a space inside the metal tube and between the first bearing and the second bearing.

20. The roller conveyor system of claim 18, further comprising a shaft, wherein the shaft extends through the metal tube and between the first bearing and the second bearing.

* * * * *